(12) United States Patent
Finstad

(10) Patent No.: US 8,899,892 B2
(45) Date of Patent: Dec. 2, 2014

(54) CARGO RESTRAINT DEVICE FOR PICK UP TRUCK

(71) Applicant: Mark Thomas Finstad, Oak Grove, MN (US)

(72) Inventor: Mark Thomas Finstad, Oak Grove, MN (US)

(*) Notice: Subject to any disclaimer, the term of this patent is extended or adjusted under 35 U.S.C. 154(b) by 0 days.

(21) Appl. No.: 13/676,369

(22) Filed: Nov. 14, 2012

(65) Prior Publication Data

US 2013/0136554 A1      May 30, 2013

Related U.S. Application Data

(60) Provisional application No. 61/629,845, filed on Nov. 29, 2011.

(51) Int. Cl.
*B60P 7/14* (2006.01)
*B60P 7/135* (2006.01)

(52) U.S. Cl.
CPC .. *B60P 7/14* (2013.01); *B60P 7/135* (2013.01)
USPC ............................................. 410/2; 410/121

(58) Field of Classification Search
USPC ........ 410/2, 121, 140, 129, 151, 94; 220/528, 220/529; 224/403, 404, 42.33; 296/39.2, 296/37.6
See application file for complete search history.

(56) References Cited

U.S. PATENT DOCUMENTS

| | | | | | |
|---|---|---|---|---|---|
| 4,508,219 | A | * | 4/1985 | O'Neill | 206/319 |
| 5,597,193 | A | * | 1/1997 | Conner | 296/37.6 |
| 5,931,632 | A | * | 8/1999 | Dongilli et al. | 414/522 |
| 6,135,527 | A | * | 10/2000 | Bily | 296/37.6 |
| 6,206,624 | B1 | * | 3/2001 | Brandenburg | 410/132 |
| 6,234,733 | B1 | * | 5/2001 | Parr | 410/94 |
| 6,503,036 | B1 | * | 1/2003 | Bequette et al. | 410/94 |
| 6,692,204 | B1 | * | 2/2004 | Ricard | 410/121 |
| 6,966,450 | B2 | * | 11/2005 | Askew | 220/529 |

* cited by examiner

*Primary Examiner* — Glenn Dayoan
*Assistant Examiner* — Sunsurraye Westbrook

(57) ABSTRACT

Described is a device that can be used in conjunction with a pick-up truck to keep items from shifting during transit. The device is designed to hook under the bottom edge of the truck tail gate when the tailgate is in the closed position.

20 Claims, 6 Drawing Sheets

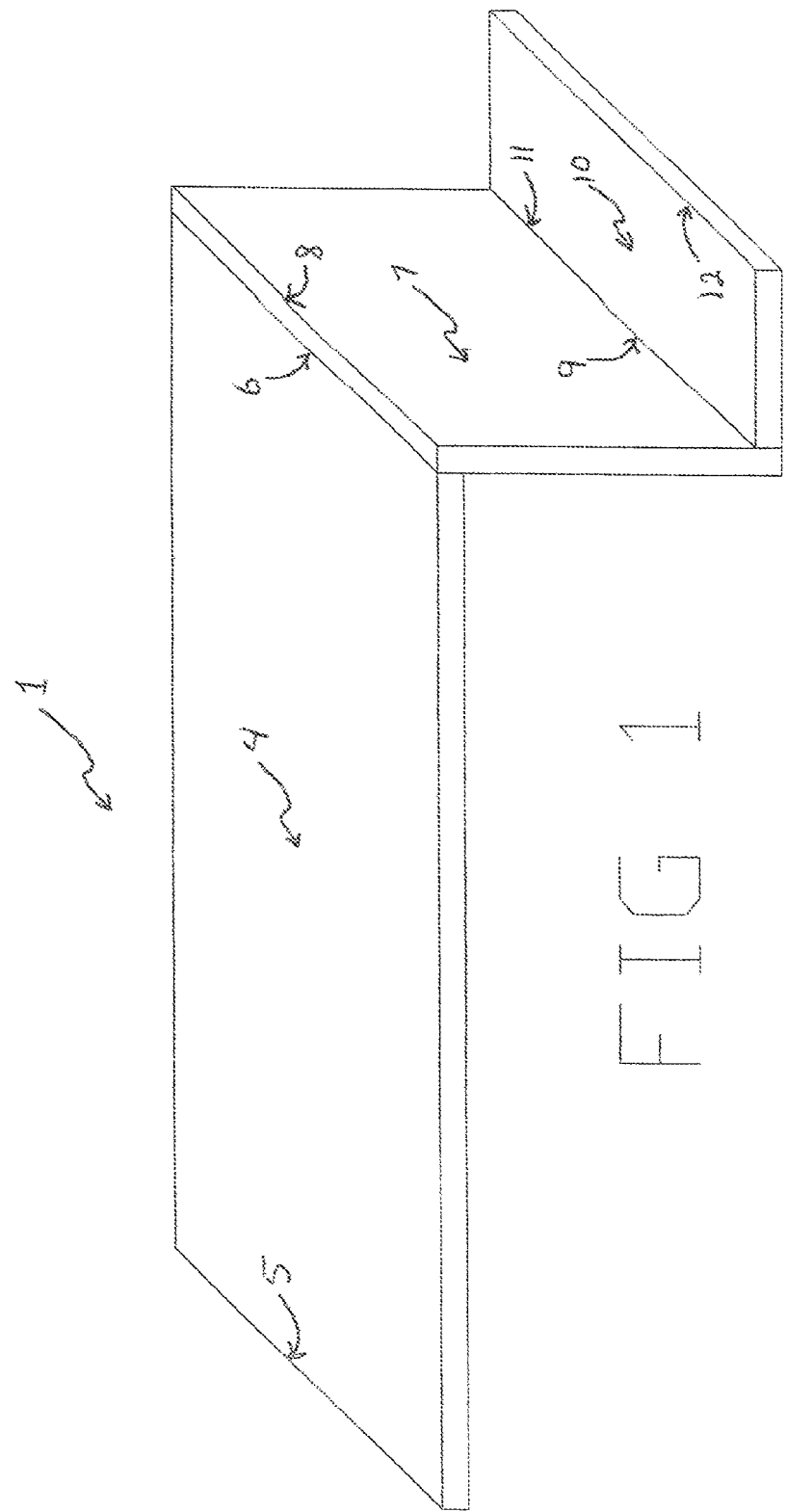

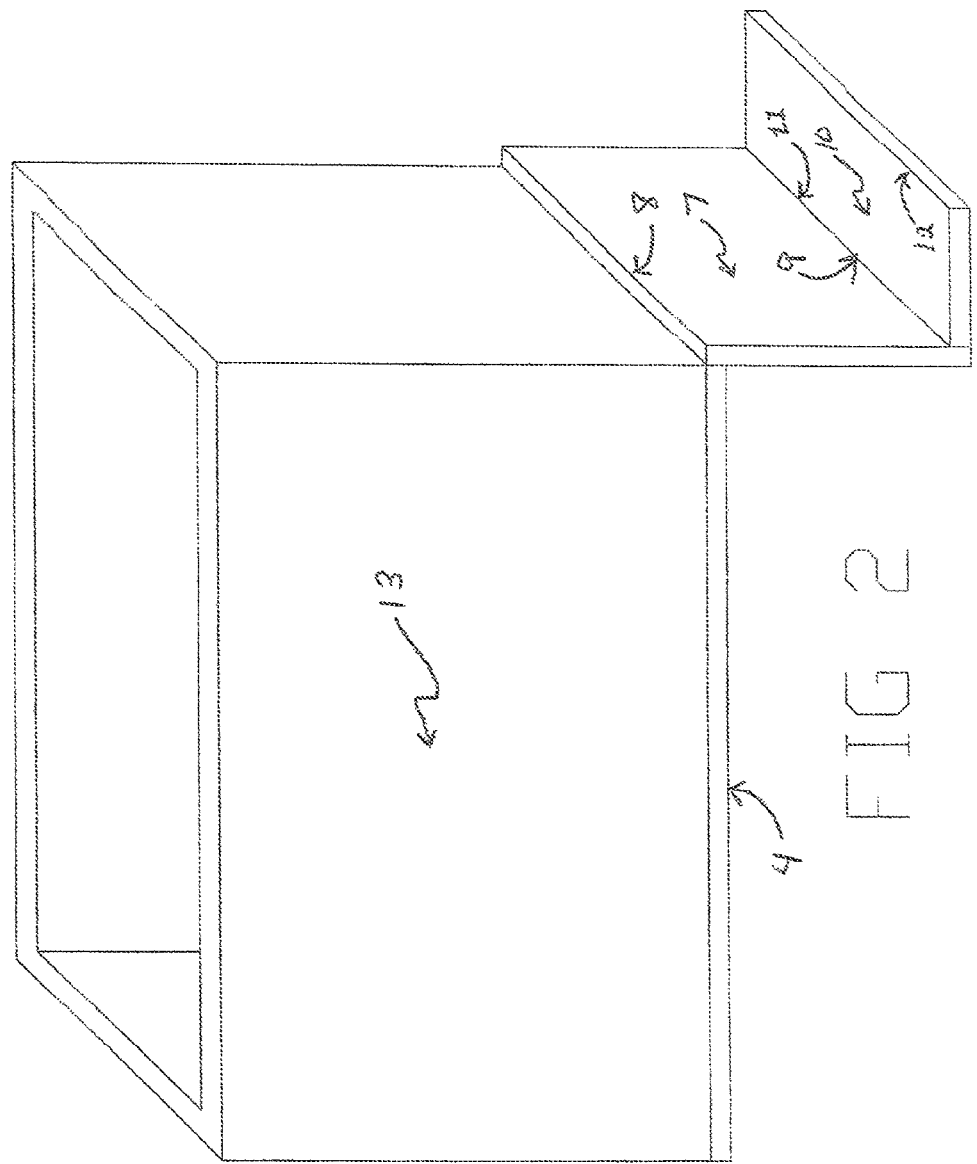

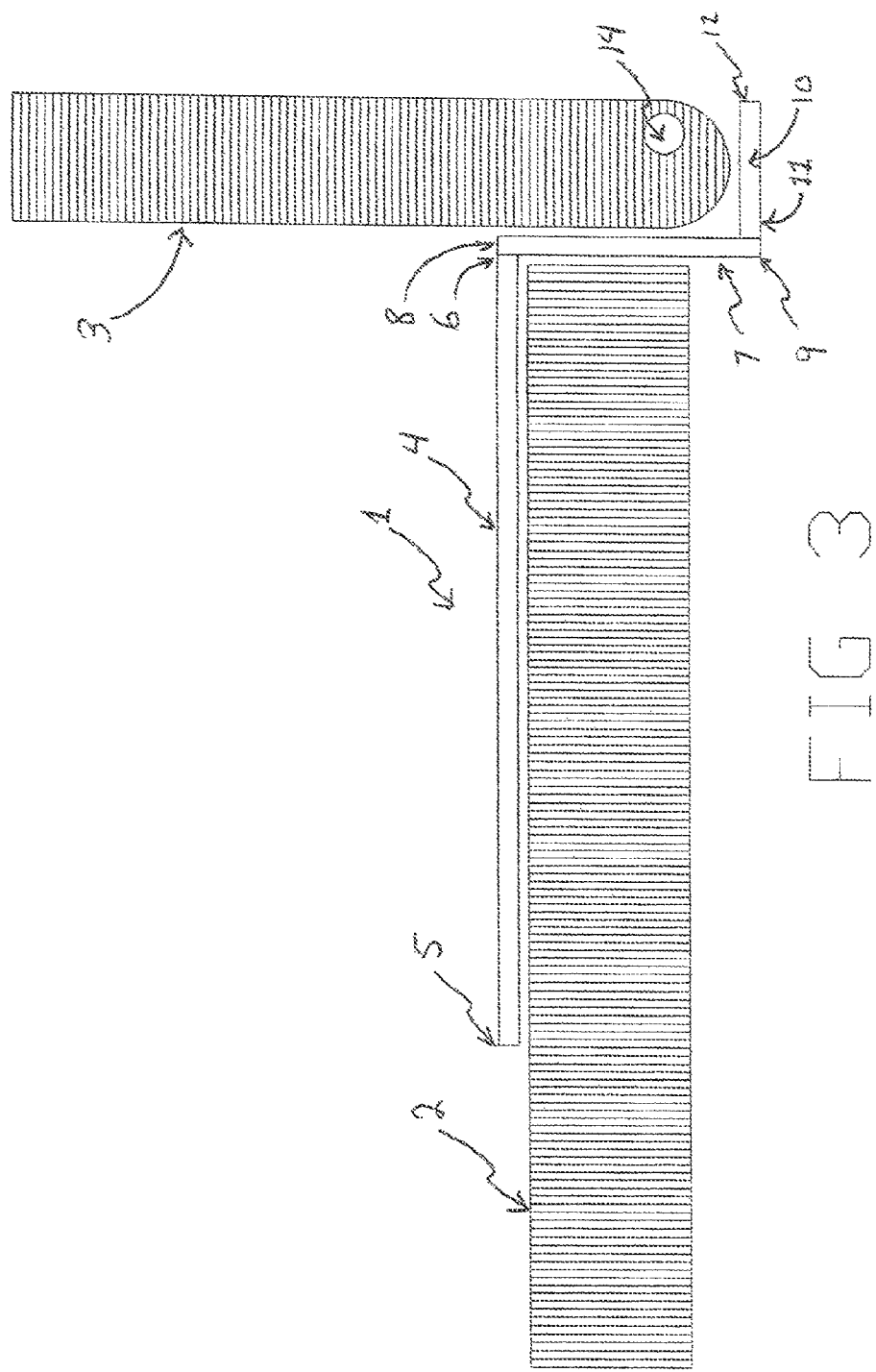

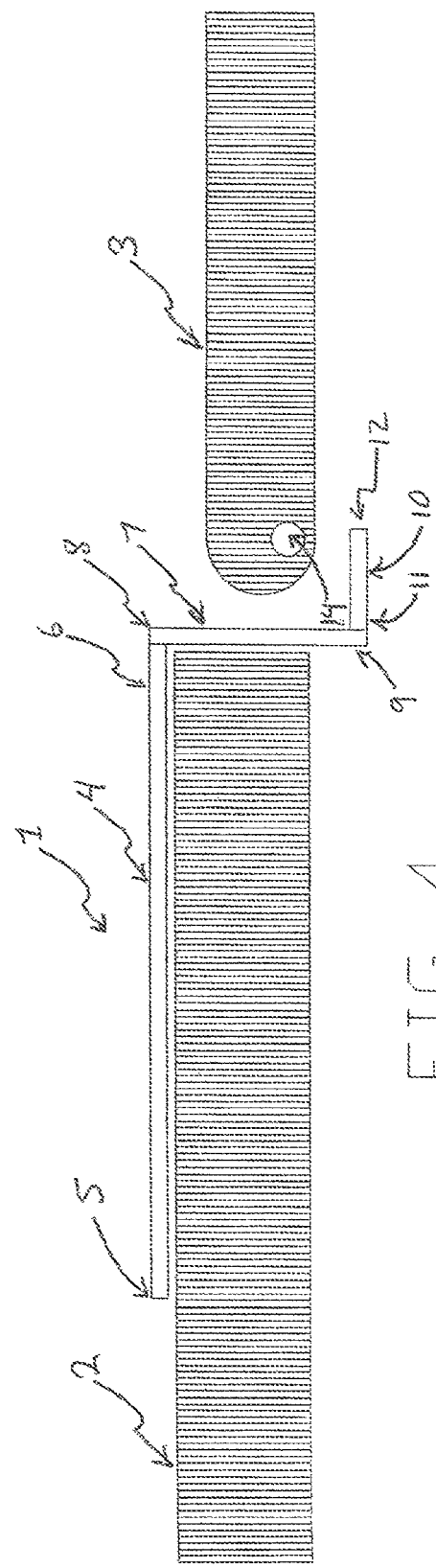

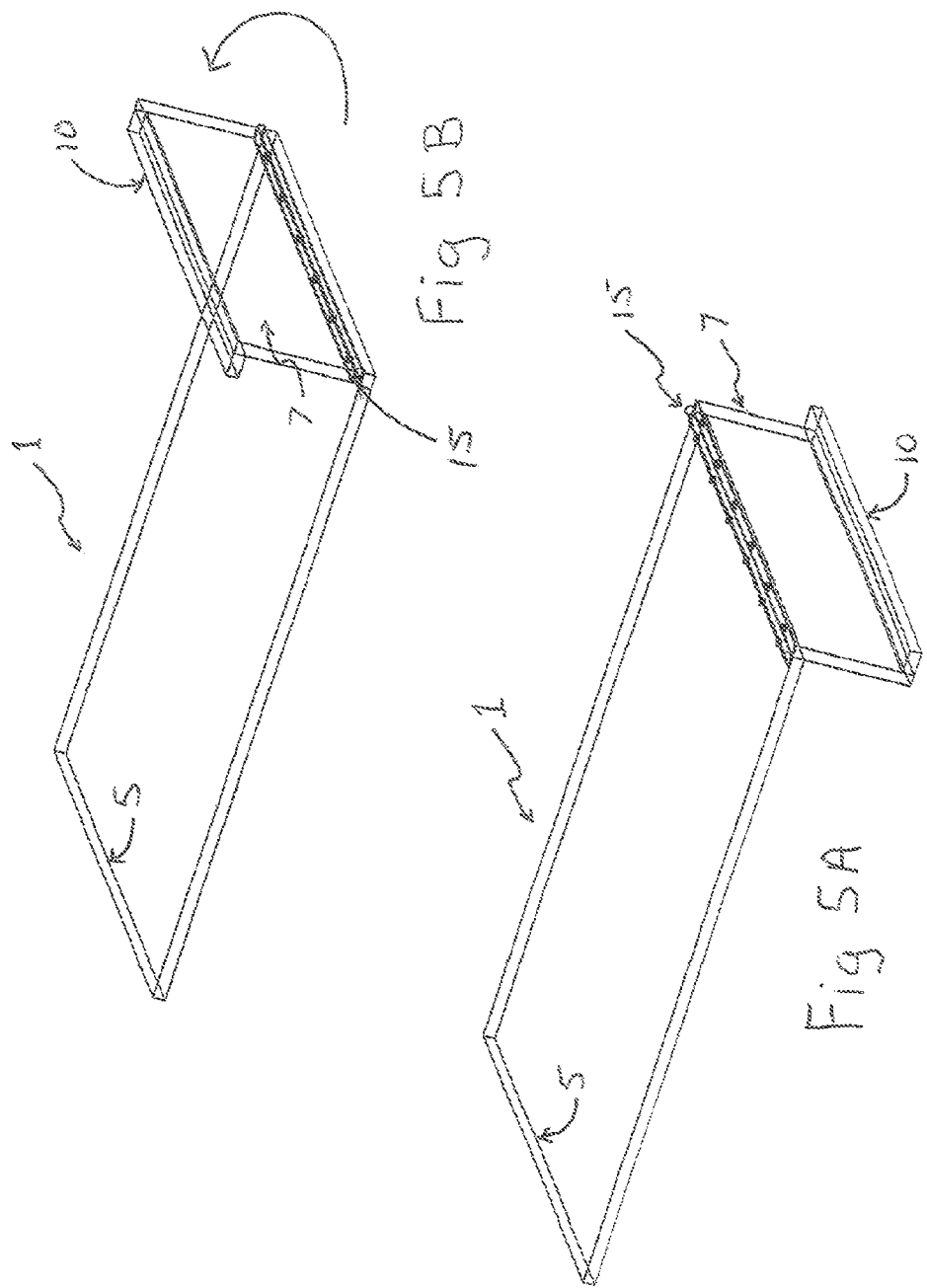

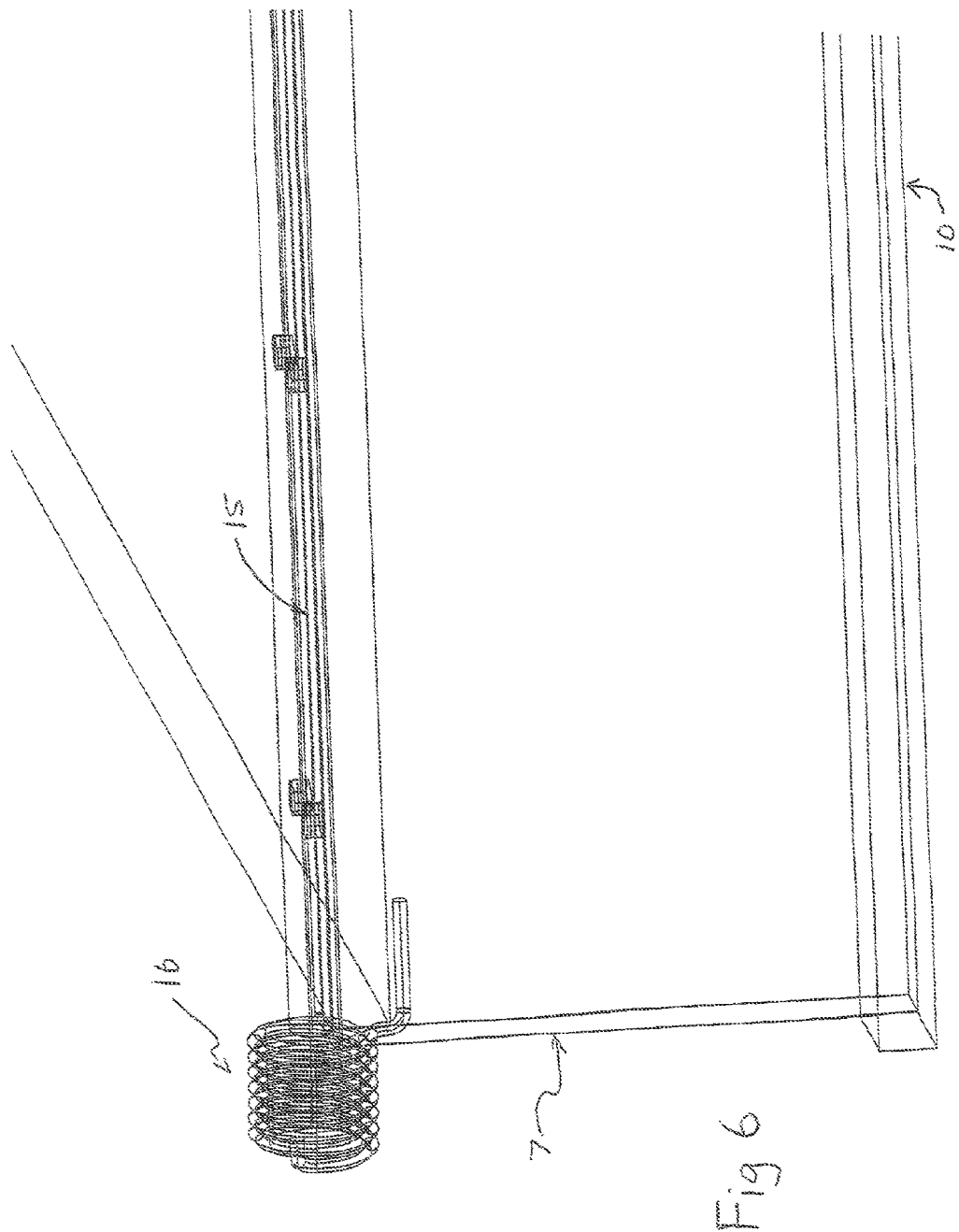

CARGO RESTRAINT DEVICE FOR PICK UP TRUCK

This application for utility patent claims the priority of provisional patent 61/629,845 filed Nov. 29, 2011.

FIELD OF THE INVENTION

The present invention relates generally to methods to keep cargo from shifting during transport in a vehicle, and more specifically to a device to used in conjunction with a pick-up truck and tail gate to restrain items from shifting when the vehicle stops, accelerates, or turns.

BACKGROUND OF THE INVENTION

Pick-up trucks are very common vehicles used throughout the world for transporting items from one location to another. These vehicles are manufactured by several US and Asian companies, but primarily by Ford, Chevrolet (GM), Dodge, and Toyota.

Pick-up trucks typically have a cargo area behind the cab of the truck. The cargo area is a flat bed that rests on the truck frame, and has sides running the length of the truck bed, and also a side running the width of the truck cab, adjacent to the cab. The back side of the truck bed has a pivoting tail gate that can be lowered to a horizontal position for loading and unloading cargo. When the tailgate is in the upright vertical position, it joins the other 3 sides and truck bed to form an open top box that can be used to carry cargo.

The problem with this system is that the cargo box is quite large on most pick-up trucks, so small items can slide around when the vehicle starts, stops, or turns. Also, the bed of the pick-up truck is typically slanted towards the cab of the truck when there is a small or light load, which makes objects even more prone to shifting forward when the truck stops. Larger items can be tied or strapped down to keep them from shifting, but small items can be difficult to secure. Also, many pick-up trucks do not have any features such as hooks within the truck bed that be used to tie a rope or strap.

Whenever a truck accelerates, slows, or turns, the contents of the truck box will tend to move around. The most common situation that occurs is when a truck is forced to stop quickly, and all the contents of the truck box will shift forward. If the stop is exceptionally quick, the contents can shift forward violently causing them to crash into the front of the truck box causing damage to the box or cargo.

One way to reduce this shifting of cargo would be to have a containment system that is unable to move when acted upon by directional or acceleration forces.

The present invention utilizes the end of the truck bed to keep the device from sliding forward when the vehicle stops, and the bottom of the tailgate to keep the load from moving side to side. The portion that engages the tailgate also prevents the entire device from rolling over during a very sharp turn.

Additional features may also be added to the front base portion such as a containment vessel that is either shaped like a box, or shaped like the specific item meant to be held in place, such as a chainsaw. Also, the base portion can contain a grid pattern of holes meant to accept removable pins. These removable pins can be placed to make a custom arrangement to follow the contour of a specific item.

SUMMARY OF THE INVENTION

An object of the present invention is to provide a cargo restraint device that will securely hold cargo in the back of a pick-up truck, and keep it from shifting during starting, stopping, and turning.

Another object of the present invention is to provide a cargo restraint device that is easy to manufacture.

Another object of the present invention is to provide a cargo restraint device that is simple to operate.

Another object of the present invention is to provide a cargo restraint device that is inexpensive to manufacture Another object of the present invention is to provide a cargo restraint device that can be easily removed when not in use.

Another object of the present invention is to provide a cargo restraint device that is very versatile and can be used on a wide range of cargo types.

Another object of the present invention is to provide a cargo restraint device that can be installed without tools.

Another object of the present, invention is to provide a cargo restraint device that can be installed Without fastening hardware.

Another object of the present invention is to provide a cargo restraint device that can be installed without modification of the truck bed (e.g. drilling holes).

BRIEF DESCRIPTION OF THE DRAWING

FIG. 1 is an isometric view of the Cargo Restraint Device for Pick-up Truck

FIG. 2 is an isometric view of the Cargo Restraint Device for Pick-up Truck including containment vessel attached to front base portion.

FIG. 3 is a cross sectional view of the Cargo Restraint Device for Pick-up Truck installed in pick-up truck bed with tailgate in up position.

FIG. 4 is a cross sectional view of the Cargo Restraint Device for Pick-up Truck installed in pick-up truck bed with tailgate in down position.

FIG. 5A is an isometric view of the Cargo Restraint Device for Pick-up Truck with the middle portion in the downward rotated position.

FIG. 5B is an isometric view of the Cargo Restraint Device for Pick-up Truck with the middle portion in the upward rotated position.

FIG. 6 is an isometric wire frame drawing of the Cargo Restraint Device for Pick-up Truck particularly illustrating one method of spring assist for the middle portion.

DETAILED DESCRIPTION OF THE PREFERRED EMBODIMENTS

The Cargo Restraint Device for Pick-up Truck 1 is particularly illustrated in FIGS. 1-5. In the preferred embodiment, the cargo restraint for pick-up truck 1 will be used in conjunction with a containment vessel 13 or system to restrain articles to the horizontal base portion 4.

The Cargo Restraint Device for Pick-up Truck 1 has a front base portion 4 where the cargo is meant to be stored. When installed in a pick-up truck, the middle vertical portion 7 fits between the truck cargo bed 2 and the closed tailgate 3. The thickness of the middle vertical portion 7 is equal to, or just slightly less than the gap between the truck cargo bed 2 and the closed tailgate 3. During a turn or rapid deceleration, the middle vertical portion 7 will contact the cargo bed 2 and the closed tailgate 3 as the Cargo Restraint Device for Pick-up Truck 1 is acted on by linear momentum. This contact will keep the Cargo Restraint Device for Pick-up Truck 1 from shift from side to side, or from shifting forward.

The Cargo Restraint Device for Pick-up Truck 1 also has a rear horizontal portion 10 that fits under the bottom of the closed tailgate 3. During a turn, the rear horizontal portion 10 contacts the bottom edge of the closed tail gate as it is acted upon by linear momentum and also centrifugal forces. This contact will keep the Cargo Restraint Device for Pick-up Truck 1 from rolling during a turn.

The containment system 13 can be a vessel that is either shaped like a box, or can be shaped for a specific item that is meant to be constrained. A typical example would be a vessel shaped to hold a chainsaw.

In a variation of the preferred embodiment, the front base portion 4 can be provided with an array or grid pattern of pre-drilled holes that are sized to accept removable mating pins. The pins can be positioned such that they contact the edges of the cargo. Each time that the cargo is changed, the pins can be repositioned to the new cargo shape.

In another variation of the preferred embodiment, the middle vertical portion 7 includes a pivotal attachment means 15 to the front base portion 4, allowing the middle vertical portion 7 to rotate up 90 degrees to 180 degrees so that the Cargo Restraint Device for Pick Up Truck 1 can be removed from the truck cargo bed 2 to be placed on the ground or other flat surface. In this variation, the middle vertical portion 7 can rotate to allow the Cargo Restraint Device for Pick Up Truck 1 to sit level on a flat surface other than the truck cargo bed 2. A spring assist means 18 may also be incorporated into this variation to automatically raise the middle vertical portion 7 when if is not constrained by the truck tailgate 3.

Having thus described in detail several embodiments of the present invention, it is to be appreciated and will be apparent to those skilled in the art that many physical changes, only a few of which are exemplified in the specification of the invention, could be made without altering the inventive concepts and principles embodied therein. It is also to be appreciated that numerous embodiments incorporating only part of the preferred embodiments are possible which do not alter, with respect to those pads, the inventive concepts and principles embodied therein. The present embodiment and optional configurations are therefore to be considered in all respects as exemplary and/or illustrative and not restrictive, the scope of the invention being indicated by the appended claims rather than the foregoing description, and all alternate embodiments and changes to this embodiment which come within the meaning and range of equivalency of said claims are therefore to be embraced therein.

PARTS LIST

1. Cargo restraint device for pick-up truck
2. Pick-up truck cargo bed
3. Pick-up truck tail gate
4. Horizontal front base portion
5. Front end of front base portion
8. Back end of front base portion
7. Middle vertical portion
8. Top end of middle vertical portion
9. Bottom end of middle vertical portion
10. Rear horizontal portion
11. Front end of rear horizontal portion
12. Back end of rear horizontal portion
13. Containment vessel
14. Tail gate pivot point
15. Pivotal attachment means of base portion to middle portion
16. Spring assist means for middle portion

I claim:

1. A cargo restraint device to be used in conjunction with a pick-up truck and tail gate to keep cargo from shifting during transit comprised of: A front base portion with front and back ends, a middle vertical portion with fop and bottom ends, and a rear horizontal portion with front and back ends, whereas said front base portion is substantially planar and lays horizontally on the bed of the pick-up truck, and said middle vertical portion is substantially planar, with said top end of middle portion extending from said back end of base portion perpendicular to the base portion, and wherein said rear portion is substantially planar, with said front end of rear horizontal portion rigidly extending from said bottom end of middle vertical portion perpendicular to said middle portion, making said middle vertical portion and said rear horizontal portion an "L" shaped unitary structure.

2. The cargo restraint device of claim 1 where the thickness of the middle vertical portion is less than or equal to the width of the gap between the bed of the truck and the tailgate when the tailgate is closed.

3. The cargo restraint device of claim 1 where the device is a unitary structure.

4. The cargo restraint device of claim 1 where the top end of middle portion is pivotally attached to the back end of base portion allowing middle portion to freely rotate.

5. The cargo restraint device of claim 1 where the top end of middle portion is pivotally attached to the back end of base portion allowing middle portion to freely rotate, further including a spring assist to automatically raise the middle portion when said middle portion is not constrained by the truck tailgate.

6. The cargo restraint device of claim 1 where the device is constructed from plastic.

7. The cargo restraint device of claim 1 where the device is constructed from metal.

8. A cargo restraint device to be used in conjunction with a pick-up truck and tail gate to keep cargo from shifting during transit comprised of: A front base portion with front and back ends, a middle vertical portion with top and bottom ends, and a rear horizontal portion with front and back ends, whereas said front base portion is substantially planar and lays horizontally on the bed of the pick-up truck, and said middle vertical portion is substantially planar, with said top end of middle portion extending from said back end of base portion perpendicular to the base portion, and wherein said rear portion is substantially planar, with said front end of rear horizontal portion rigidly extending from said bottom end of middle vertical portion perpendicular to said middle portion, making said middle vertical portion and said rear horizontal portion an "L" shaped unitary structure, further including a containment vessel attached to said base portion.

9. The cargo restraint device of claim 8 where the thickness of the middle vertical portion is less than or equal to the width of the gap between the bed of the truck and the tailgate when the tailgate is closed.

10. The cargo restraint device of claim 8 wherein the containment vessel is shaped to contain a chainsaw.

11. The cargo restraint device of claim 8 where the device is a unitary structure.

12. The cargo restraint device of claim 8 where the fop end of the middle portion is pivotally attached to the back end of base portion allowing the middle portion to freely rotate.

13. The cargo restraint device of claim 8 where the top end of middle portion is pivotally attached to the back end of base portion allowing middle portion to freely rotate, further including a spring assist to automatically raise the middle portion when said middle portion is not constrained by the truck tailgate.

14. The cargo restraint device of claim 8 where the device is constructed from plastic.

15. A cargo restraint device to be used in conjunction with a pick-up truck and tail gate to keep cargo from shifting during transit comprised of: A front base portion with front and back ends, a middle vertical portion with top and bottom ends, and a rear horizontal portion with front and back ends, whereas said front base portion is substantially planar and lays horizontally on the bed of the pick-up truck, and said middle vertical portion is substantially planar, with said top end of middle portion extending from said back end of base portion perpendicular to the base portion, and wherein said rear portion is substantially planar, with said front end of rear horizontal portion rigidly extending from said bottom end of middle vertical portion perpendicular to said middle portion, making said middle vertical portion and said rear horizontal portion an "L" shaped unitary structure, and wherein said base portion contains holes meant to accept removable pins to create a custom arrangement to follow the contour of a specific cargo item or items.

16. The cargo restraint device of claim 15 where the thickness of the middle vertical portion is less than or equal to the width of the gap between the bed of the truck and the tailgate when the tailgate is closed.

17. The cargo restraint device of claim 15 where the device is a unitary structure.

18. The cargo restraint device of claim 15 where the top end of the middle portion is pivotally attached to the back end of base portion allowing the middle portion to freely rotate.

19. The cargo restraint device of claim 15 where the fop end of middle portion is pivotally attached to the back end of base portion allowing middle portion to freely rotate, further including a spring assist to automatically raise the middle portion when said middle portion is not constrained by the truck tailgate.

20. The cargo restraint device of claim 15 where the device is constructed from plastic.

\* \* \* \* \*